Figure 2:
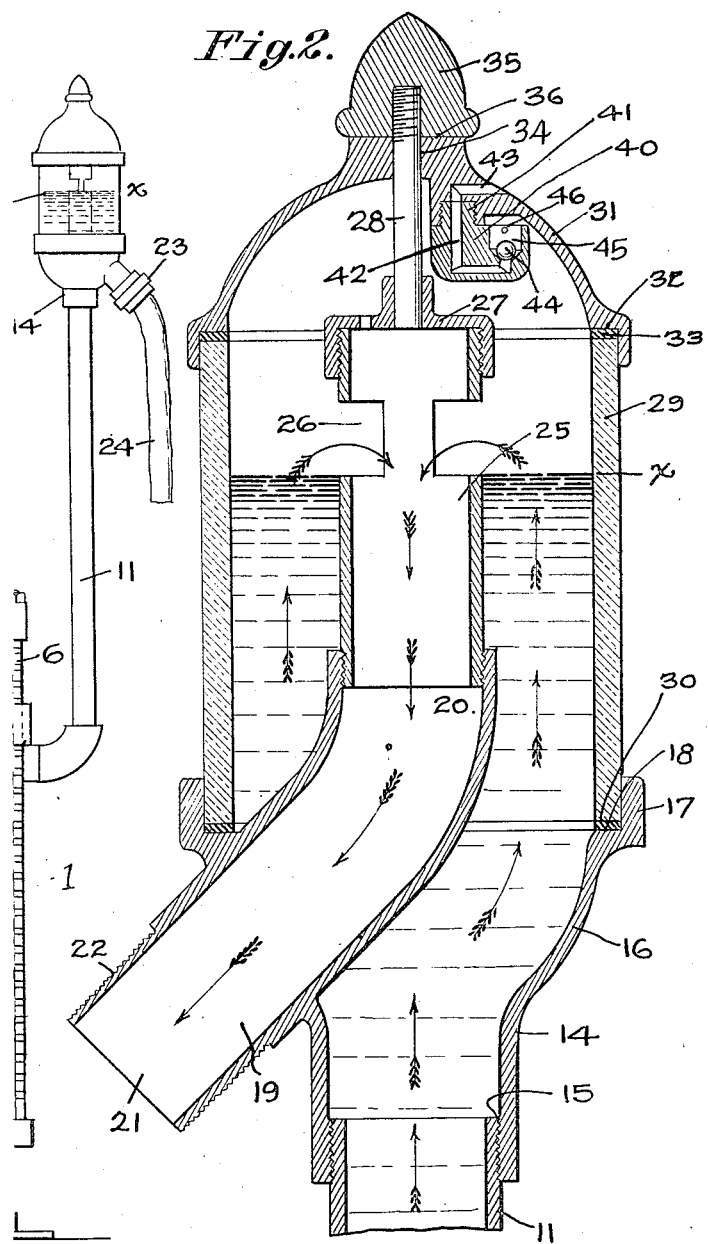

M. W. JOY.
VISIBLE FLUID GAUGE.
APPLICATION FILED SEPT. 2, 1920.

Patented July 25, 1922.

Inventor.
MARSHALL W. JOY
By Baldwin Vale
Attorney

TES PATENT OFFICE.

OY, OF SAN FRANCISCO, CALIFORNIA.

VISIBLE FLUID GAUGE.

Specification of Letters Patent.   Patented July 25, 1922.

Filed September 2, 1920. Serial No. 407,757.

therein. The plunger is provided with a piston rod 3 connected to a cross-head 4, having the gear rack members 5 and 6 respectively, provided on the opposite sides thereof, and guided in the bearings 7. A shaft 8 journalled in the said bearings has suitable spur gears thereon, not shown, meshing with the teeth of the gear racks 5 and 6 and rotated by the handle 9 mounted thereon. Thus rotative movement of the handle 9 rotates the gears and raises the racks 5 and 6 vertically, lifting the plunger within the cylinder and displacing the fluid contained between the plunger and the head 10 of the cylinder to force all fluid outwardly through the priming column 11, into the reservoir of the visible fluid gauge 12.

The gauge 12 consists of a base member 14 threaded interiorly thereof at 15 for engagement with the outer end of the priming column 11. The opposite end of the base member 14 is flared outwardly at 16 into an enlarged annular chamber, terminating in an exterior shoulder 17 extending peripherally therearound and provided with an inner annular shoulder 18.

The base member 14 is provided with an outlet conduit 19 integrally formed thereon and extending through the chamber 16 with the end 20 concentrically located within the base member 14 and the opposite end 21 projecting outwardly therefrom and at an angle of substantially 45° to the axis of the base member 14. The outlet end 21 is exteriorly threaded at 22 for engagement with the connecting union 23 of the dispensing hose 24.

The inlet end 20 of the outlet conduit is threaded for engagement with the threaded tubular casing 25, axially positioned therein and provided with circumferential openings 26 for the purpose to be hereinafter described in detail. The upper end of the casing 25 is enclosed with a cap 27 having a threaded stud 28 extending therefrom.

The transparent casing 29 in the form of cylindrical glass member is adapted to enclose the casing 25 and outlet conduit 19 and is seated within the shouldered portion 18 of the base member 14 and rests upon the lead gasket 30. Shellac, grease, or other substance may be used for hermetically sealing the connection between the base member 14 and glass 29 to prevent the escape of fluid contained within the reservoir. A hemispherically shaped cap section 31 having the annularly shouldered portion 32 formed therein is adapted to engage the opposite end of the transparent casing 29 and to rest upon a gasket 33 interposed therebetween and is provided with a concentric hole 34 through which the stud 28 passes. A suitable cap nut 35 is adapted to engage the threaded end of the stud 28 and to firmly seat against the embossment 36 provided on the cap 1 for exerting a pressure thereagainst and binding the cap 31, transparent casing 29 and base portion 14 into an integral unit. The various members in assembled position form a hermetically sealed container of extremely simple construction and life long durability.

This device operates as follows:

Movement of the pump handle 9 reciprocates the piston within the pumping system to force the fluid out through the priming column 11 and into the reservoir of the gauge 12. As the volume of fluid within the interior of the reservoir increases and the incoming supply continues, the surplus passes through the openings 26 into the casing 25 and outlet conduit 19 and into the dispensing hose 24 through which it is conveyed to a suitable source of use. After a predetermined quantity of fluid has been exhausted from the pump 1, the surplus fluid within the reservoir 12 escapes and leaves normal level therein, indicated by the mark X. A purchaser of gasoline is thus accustomed to know that the system from which he obtains his supply should have a head within the priming column and gauge glass on a line with the lowermost edge of the opening in the outlet conduit—a level clearly apparent from quite a distance. The cap 31 is provided with an air pressure release valve for the purpose of keeping the air pressure within the reservoir equal at all times to the atmosphere. This valve consists of a U-shaped member 40 having a threaded end 41 in engagement with the underside of the upper cap 31 and suitably drilled at 42 with a vent hole registering with a companion vent 43 provided in the cap 31 leading to the atmosphere. The inner end of the vent pipe 42 is closed by the ball-weight 44 confined in the tapered chamber 45 by the transverse rod 46 extending across the interior thereof. The pressure release valve is necessary for the reason that upon commencing the operation of dispensing the fluid, the volume of incoming liquid forced into the reservoir displaces the air and seals all channels of escape and confines the same within the interior of the cap 31. The compressed air thus tends to force the surplus fluid above the level X out through the dispensing hose to the atmosphere, to equalize the air pressure. The last fluid that leaves the interior of the reservoir would ordinarily be prevented from completely escaping on account of the vacuum formed within the chamber 12, and dispensing hose, but the ball check valve 45 is calibrated to unseat the air vent 42 should the pressure within the reservoir vary above or below normal atmospheric pressure. The air valve operates automatically upon the completion of each dispensing operation and is a necessary part of the gauge construction for neutralizing the air pressure within the reservoir.

Having thus described this invention, what I claim and desire to secure by Letters Patent is:

1. A fluid gauge comprising an open ended casing adapted to detachably engage the priming column of a fluid pump; an outlet conduit formed integrally with said casing and substantially in the center thereof; a transparent cylindrical member adapted to be mounted on said casing around said outlet and a closure adapted to be secured to said outlet and to engage said cylindrical member.

2. A fluid gauge comprising an open ended casing adapted to detachably engage the priming column of a fluid pump; a transparent cylindrical member secured to said casing; an outlet conduit integrally formed in said casing and spaced away from said cylindrical member, said conduit having a port therein for maintaining a fluid level within said column at a predetermined point and a closure adapted to be secured to the end of said outlet conduit and to engage said transparent cylindrical member.

3. In combination with a fluid pump having a priming column in the outlet thereof of a transparent casing for indicating the fluid level therein; an outlet port formed within said casing for maintaining said liquid level at a predetermined point within the normal vision from without and means whereby all fluid drawn from said pump passes through said casing.

4. A fluid gauge comprising a transparent casing adapted to detachably engage the priming column of a fluid pump for indicating the fluid level therein; an outlet conduit integrally formed in said casing and a port within said conduit for maintaining said level at a predetermined point within the normal vision from without.

5. A fluid gauge comprising a transparent casing adapted to detachably engage the priming column of a fluid pump for indicating the fluid level therein; an outlet conduit integrally formed in said casing and a port within said conduit for maintaining said level at a predetermined point within the normal vision from without; and means whereby all fluid drawn from said pump passes through said gauge.

6. A fluid gauge comprising a casing adapted to detachably engage the priming determined point within the normal vision from without and means whereby all fluid drawn from said casing passes through said exhaust port and outlet conduit; and an air pressure release mechanism mounted within said casing.

9. An overhead drain valve adapted to be secured to the top of the standpipe of a liquid dispensing apparatus having in combination means for admitting the liquid to be dispensed thereinto from below, a body wall partly of transparent material, a vent to ensure complete draining of the discharge outlet, a valve to prevent the escape of liquid through said vent, and an outlet pipe whose upper end terminates within the device in range of normal vision from without, said outlet pipe adapted to ensure the retention of a body of the liquid within the device in sight from without, when the device is idle.

In testimony whereof, I have hereunto set my hand at San Francisco, California, this 27th day of August, 1920.

MARSHALL W. JOY.

In presence of—
  LINCOLN V. JOHNSON.